April 16, 1968 — W. A. MORTON — 3,378,243
LEHR WITH TRANSVERSE TEMPERATURE CONTROL
Filed Oct. 24, 1965 — 2 Sheets-Sheet 1
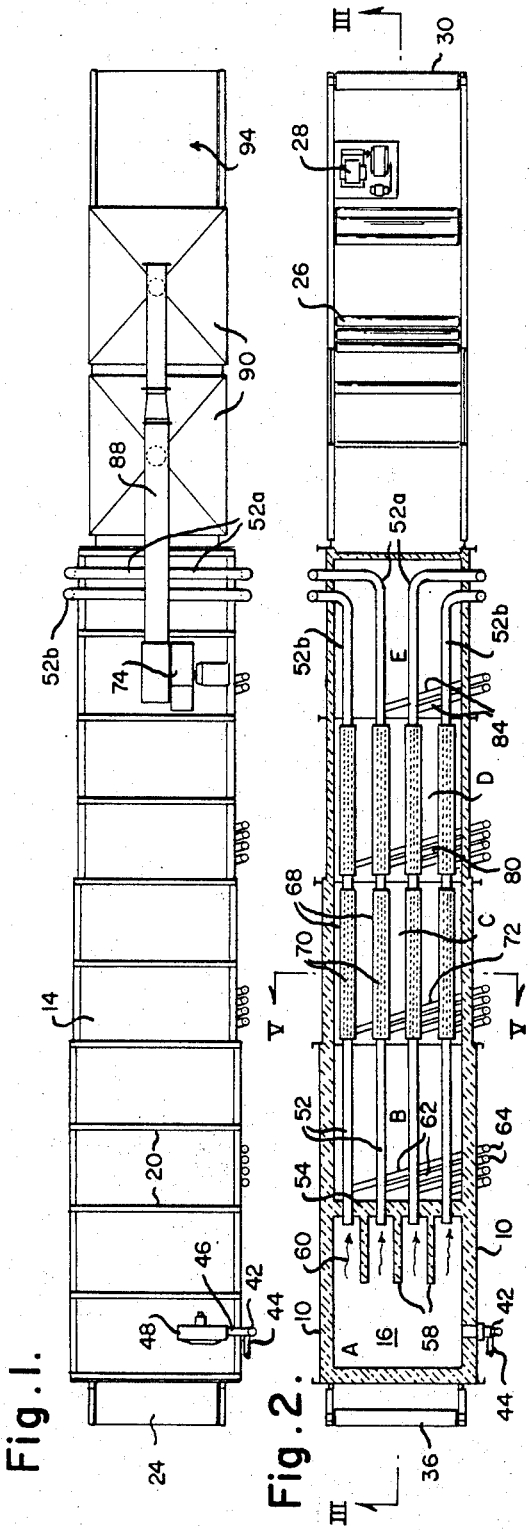
INVENTOR
William A. Morton
By George R. Clark
Att'y April 16, 1968  W. A. MORTON  3,378,243
LEHR WITH TRANSVERSE TEMPERATURE CONTROL
Filed Oct. 24, 1965  2 Sheets-Sheet 2

INVENTOR
William A. Morton
By George A. Clark
atty

United States Patent Office 3,378,243
Patented Apr. 16, 1968

3,378,243
LEHR WITH TRANSVERSE TEMPERATURE CONTROL
William A. Morton, Pittsburgh, Pa., assignor, by mesne assignments, to Sunbeam Corporation, a corporation of Illinois
Filed Oct. 24, 1965, Ser. No. 504,321
14 Claims. (Cl. 263—8)

ABSTRACT OF THE DISCLOSURE

A tunnel type lehr is disclosed for annealing glassware and the like. The lehr is provided with means for controlling transverse temperature gradients as well as longitudinal temperature gradients in a novel manner. The lehr structure is provided with tandem groups of heat exchanging conduits spaced along the length of the lehr with each group of such conduits being spaced laterally across the width of the lehr. A group of valved tempering conduits are connected respectively to some or all of the conduits in each of the aforementioned groups of conduits or equivalent heat exchanging means for introducing individual quantities of tempering air. Thus, the amount of air introduced can be varied both transversely and longitudinally of the lehr structure to control the temperature gradients therein. Moreover, the control of transverse temperature gradients in a given zone of the lehr can be effected independently of other zones if desired.

---

The present invention relates to an apparatus for annealing glassware and has particular relation to lehrs of the tunnel type, through which a relatively large quantity of glassware is transported by means of a continuous conveyor belt or the like. In this type of lehr the glassware is subjected to varying temperature environments or gradients in order to relieve strains imparted to the glassware during preceding manufacturing steps.

In conventional lehr structures, precise control of the longitudinal and transverse temperature gradients within the lehr was difficult if not impossible. Moreover, little or no provision was made to control or dissipate the heat brought into the lehr with the hot glassware placed therein for annealing. Further, in known lehr structures no means were provided for conserving the relatively low-temperature exhaust gas heat. The glassware manufacturing equipment had to be located some distance from the annealing lehr due to the construction of conventional transfer conveyor, which resulted in poor fuel economy and made the glass annealing process more difficult to control, in addition to small, but significant, increase in production time.

These difficulties are eliminated in a unique manner by the invention which provides means for controlling the transverse temperature gradients in various heating or cooling zones throughout the length of the lehr without the use of multiple firing chambers and separate flue structures. This is accomplished by the use of heat exchanging means which are adjustable across the width of the lehr, or by the use of similarly adjustable tempering means, or by both. In addition, the longitudinal temperature gradient throughout the lehr can be carefully adjusted through the use of a number of such heat exchanging means spaced along the length of the lehr, with or without the use of spaced tempering means. Such heat exchanging means are further arranged to apply differing rates of cooling, as required, directly to the glassware passing through the lehr. Thus, the expensive conventional beating fans used for this purpose are eliminated. In another arrangement of the invention, the aforesaid heat exchanging means can be coupled to the exhaust gas outlet of the lehr to provide additional control over the cooling air supplied to the glassware from the heat exchanging means and to conserve a portion of the heat normally lost with the exhaust gases.

In still another arrangement of the invention novel conveyor means are associated with the annealing lehr of the invention for decreasing production time and for permitting the glassware to be placed in the lehr at a substantially higher temperature in order to improve fuel economy and to improve the annealing characteristics of the glassware.

These and other objects, features, and advantages of the invention, together with structural details thereof, will be elaborated upon during the forthcoming description of exemplary modifications of the invention, with the description being taken in conjunction with the accompanying drawings wherein:

FIGURE 1 is a top plan view of one form of glass annealing lehr constructed in accordance with the teachings of the invention;

FIGURE 2 is a longitudinal and horizontal section of the annealing lehr illustrated in FIGURE 1 and taken generally along reference plane II—II of FIGURE 3;

FIGURE 3 is a longitudinal and vertical section of the annealing lehr of FIGURES 1 and 2, taken generally along reference plane III—III of FIGURE 2 and;

FIGURE 4 is a transverse sectional view of the annealing lehr shown in the preceding figures and taken generally along reference plane IV—IV of FIGURE 3;

FIGURE 5 is a cross-sectional view of the lehr illustrated in FIGURE 2 and taken along reference plane V—V thereof;

Figure 6:
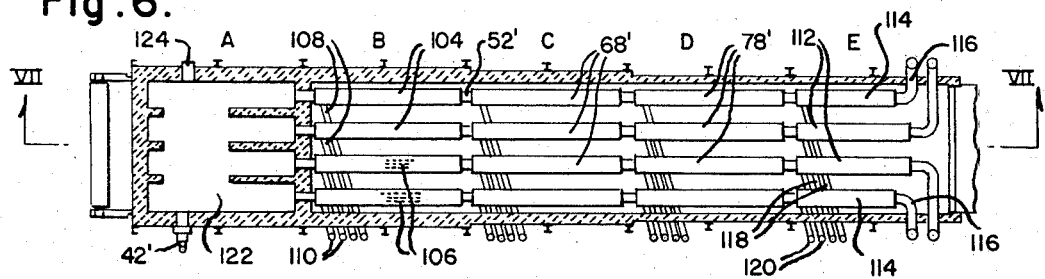
FIGURE 6 is a longitudinal and horizontal view of another annealing lehr arrangement in accordance with the invention and taken along substantially reference plane VI—VI of FIGURE 7.

Referring now more particularly to the drawings, the illustrated form of the annealing lehr of the invention comprises a pair of upstanding wall structures 10 which, together with bottom and ceiling walls 12 and 14 define the major portion of the tunnel lehr. In the region of combustion chamber 16 the inner surface of the walls 10–14 are lined with firebrick or the like while the remainder of the wall structures are formed from expanded metal and rack wool insulating panels, of course, other materials can be employed depending upon their economic availability.

The aforesaid wall structures are supported by a plurality of vertical frames 20 formed from I-beams of the like. A conveyor roller 22 is rotatably supported at the lower end of each of the supporting frames 20 so as to extend horizontally and transversely of the lehr structure. The rollers 22 support the return section of the conveyor belt 24 throughout the length of the lehr structure with the exception of the three end most frames 20a where the rollers 22 are omitted to accommodate a belt take-up unit 26 and drive unit 28 of known construction. At the adjacent end of the lehr structure, a conveyor belt return roller 30 of relatively larger size, is mounted. The top surface of the return roller 30 is aligned with a conveyor belt skid member 32 extending along the length of the lehr structure and supported upon a plurality of cross braces 34, preferably also of I-beam construction. At the other or front end of the lehr, a similar return roller 36 is similarly disposed, where it operates in conjunction with an auxiliary return roller 38 mounted adjacent the bottom of the front end portion of the lehr.

The conveyor belt 24 is formed from woven wire or other foraminous structure to permit the flow of heating and cooling air therethrough. In furtherance of this purpose, the skid member 32 is a foraminate member formed as by perforating.

The combustion chamber 16 is provided with a ceiling structure 40 which serves as a heat shield to prevent the application of direct exhaust gases to the conveyor structure and other components of the lehr. A fuel injector such as a gas burner 42 is mounted in one of the wall structures 10 of the lehr adjacent the rearward end of the combustion chamber. As better shown in FIGURE 1, the burner 42 is provided with a gas inlet 44 and an air inlet conduit 46 which in turn is connected to an air blower 48, mounted above the ceiling wall of the lehr adjacent the front opening 50 thereof. In this example, the air blower and associated support, are mounted across an end-most pair of the supporting frames 20.

In this arrangement of the invention, the exhaust gases from the combustion chamber 16, which forms zone A of the lehr, are conducted through the exhaust portion 18, or zones B, C, D and E of the lehr by means of a plurality of elongated tubes 52, with four such tubes being employed in this arrangement of the invention. The tubes 52 are supported initially by the partition 54 between the combustion chamber 16 and zone B of the exhaust chamber 18 and throughout their lengths by a number of transverse I-beams 56 or the like which in turn are secured to appropriate ones of the supporting frames 20. The exhaust tubes 52 are fabricated, in this example, from a high temperature, structural alloy such as #2515 stainless steel which can tolerate a maximum sustained temperature of about 1700° F.

The inlet ends of the exhaust tubes 52 are segregated by means of partitions 58 extending longitudinally through the firing chamber to guide the exhaust gases from the firing chamber into the adjacent ends of the exhaust tubes as denoted by flow arrows 60 (FIGURES 2 and 3) and also serve to promote a more even lateral distribution of exhaust gases passing through the tubes 52. In furtherance of this purpose the partitions 58 are respectively provided with aligned apertures 59.

For optimum glass annealing characteristics and to prevent damage to the exhaust tubes 52, the temperature of the combustion or exhaust gases at the points of their entry into the exhaust tubes 52 is limited to about 1700° F. in this example of the invention. A sufficient excess of combustion air is blown into the combustion chamber 16 by the blower 48 to hold the exhaust gases at this temperature. In the initial exhaust heating or annealing zone, which shall be designated by the reference letter B of the exhaust area 18, the temperature of the exhaust gases drops to about 1500° F. The exhaust gas temperature in each tube 52 is maintained at the same level across the width of the lehr by a plurality of tempering or air inlet conduits 62 which are coupled respectively to the exhaust tubes 52 adjacent their inlet ends. The tempering inlets 62 therefore, are four in number and are connected to a source (not shown) of relatively cool air. In each of the tempering conduits is mounted a valve 64 which can be either manually or thermostatically controlled. A suitable temperature sensor (not shown) is mounted in each exhaust tube 52 for the purpose of controlling the aforementioned thermostat or for actuating suitable temperature indicia for manual control, as the case may be. In any event, the temperature sensor is located several feet downstream of the junction of each tempering conduit 62 with its associated exhaust tube 52 to allow thorough mixing of exhaust gases and tempering air before contacting the sensor. With the arrangement thus far described, sufficient tempering air can be introduced into all of the exhaust tubes 52 to effect a desired uniform temperature drop, or into one or more of the exhaust tubes 52 individually when required to ensure that the exhaust gas temperature is substantially identical in each tube 52. The exhaust tubes 52, will, of course, radiate heat upwardly to the glassware supported on the conveyor belt 24 to prevent too rapid cooling thereof. If desired, the outermost exhaust tubes 52 can be operated at slightly higher temperature relative to the central exhaust tubes in order to compensate for heating losses through the side wall structure 10. Thus a uniform transverse temperature gradient can be obtained throughout zone B.

From the annealing zone B, the glassware is conveyed on the belt 24 in the direction denoted by arrow 66 to a second exhaust heating or annealing zone denoted by reference letter C. In zone C, the most critical of the annealing temperature sequence is accomplished. In order to permit complete removal of the strains which have been introduced into the glassware by previous manufacturing steps, it is essential that each item of glassware throughout the zone C be maintained at a constant temperature of about 1060° F. The heat necessary to maintain this temperature is derived from the aforementioned exhaust gases through the use of novel heat exchanging means associated with each exhaust tube 52 within zone C.

In this arrangement of the invention, such heat exchanging means are provided in the form of a concentric or sleeve tube 68 surrounding each of the exhaust tubes 52 and extending longitudinally therewith substantially along the length of zone C. Each heat exchanging tube 68 is perforated along the top surface thereof, (as better shown in FIGURE 2 of the drawings), with the perforations in this example being about ¼" in diameter and spaced about one inch apart. The annular spaces between the sleeve tubes 68 and the exhaust tubes 52 are closed at each end by annular closures 71 (FIGURE 5).

Adjacent the front end of each heat exchange tube 68 an air inlet conduit 72 is joined in communication therewith. Sufficient, relatively cool air is forced through each of the tubes 72 by means of a suitable blower (not shown) to maintain an air temperature of about 1060° F., as it issues from the perforations 70 of the heat exhaust tubes 68. With the size and number of perforations 70, as indicated, the air temperature at each perforation will be substantially the same due to the fact that the longer heat exchanging time of the more remote perforations from the air inlet tube 72 will counter-balance the progressive lowering of exhaust tube temperatures. Where a less volume of cooling air is required, a portion of the exhaust gases can be withdrawn from the exhaust blower 74 to the air inlet conduit 72 as denoted alternatively in dashed outline by the valved conduit 76. The air thus blown into the tunnel portion of the lehr, via the heat exchanging tubes 68 and also via heat exchanging tubes 78 described below maintains a positive pressure differential within the lehr which is important in preventing ambient cold air drafts.

Further control of the longitudinal temperature gradient can be accomplished, when required, in the next or succeeding exhaust zone D, where heat exchanging means of similar construction are employed. The last-mentioned heat exchanging means including sleeve tubes 78 have respective inlet conduits 80 and are utilized when difficult to anneal glassware such as Pyrex is passing through the lehr, or when the conveyor belt 24 is not fully loaded. In zone D, the temperature of the glassware is depressed uniformly to about 980° F. by means of the heated air issuing from the perforations of the zone D sleeve tubes 78. Because of the lower temperature of the exhaust gases in zone D, in many annealing situations it is necessary to supply heated air to the air inlet conduits 80. This is accomplished by mixing a proportion of the outlet exhaust gases therewith through alternative conduit 82 (FIG. 3), which is similar to the conduits 76 described above.

From zone D, the glassware passes into the final heated portions of the annealing cycle, zone E. In this zone, the glassware is heated principally by radiation from the adjacent portions of the exhaust tubes 52, and the annealing temperature is maintained substantially constant transversely of the lehr by means of a pair of tempering inlet tubes 84 coupled in communication with the two central exhaust tubes 52a, respectively, and to an external source of cooler air such as a blower (not shown) to compensate for the greater heat losses in the outermost exhaust tubes 52b by reason of their disposition adjacent the wall structure 10. As the glassware issues from the exit opening 86 of the heated portion of the lehr, its temperature is about 600 to 700° F., or about the same temperature as that of the exhaust gases as they leave zone D through the exhaust tubes 52. The latter tubes are connected at their outlet ends to an overhead exhaust duct 88, which in turn, is coupled to the suction opening of the exhaust blower 74. From the exit opening 86 the conveyor belt 24 conveys the glassware under a pair of tandemly supporting exhaust hoods 90 whose outlets 92 also are coupled to the exhaust duct 88. The blower 74 is of sufficient size so that the air drawn upwardly through the foraminous belt 24 and the glassware thereon is sufficient to cool the glassware to about 150° F. at the unloading end 94 of the conveyor belt. A wafer type control valve 96 (of known construction) is mounted in the outlet 92 of each exhaust hood in order to vary the air flow induced thereby.

Figure 7:
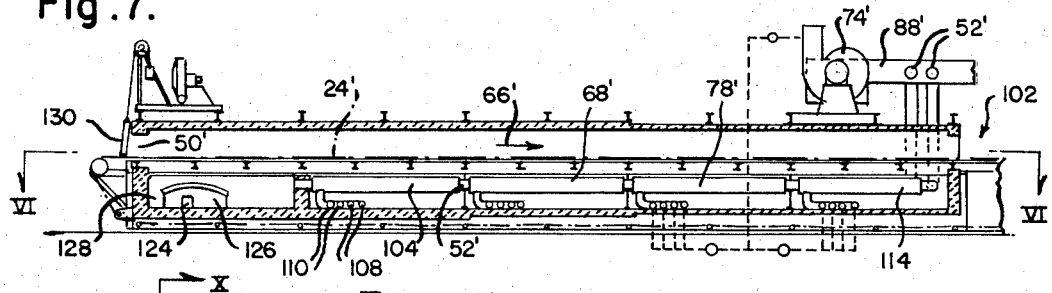
FIGURE 7 is a longitudinal and vertical view of the annealing lehr illustrated in FIGURE 6 and taken along reference plane VII—VII thereof.

Referring now to FIGURES 6 and 7 of the drawings, another form of annealing lehr, arranged in accordance with the invention, is illustrated therein. In the latter example, the annealing lehr is provided in a length and overall contour similar to the lehr described previously in connection with FIGURES 1 to 5. Thus, the lehr is provided with, in this example, five heating and annealing zones A, B, C, D, and E, and with an after-cooling section similar to that represented by the exhaust hoods 90 of FIGURES 1 and 3, an initial broken-away portion of which is designated by reference character 102 (FIGURE 7). The other component parts of FIGURES 6 and 7 which are generally similar to those of FIGURES 1 to 5 are designated with similar reference characters with primed accents.

In areas of construction designated by zones C and D of FIGURES 6 and 7, the present modification of the annealing lehr is similar to zones C and D in FIGURES 1 to 5, and accordingly will not be further elaborated upon. In zone B of FIGURES 6 and 7 the tempering inlets 62 of FIGURES 2 and 3 have been omitted and a perforated tubular sleeve 104 is placed spacedly around each of the exhaust tubes 52'. The sleeves 104 are similar in construction to the sleeves 68' and 78' with the exception that their perforations 106 are more closely spaced in order to accommodate the higher temperature in the adjacent portions of the exhaust tubes 52'. The tubular sleeves 104 are connected respectively to a like number of regulated or valved inlet conduits 108 for the admission of air into the annular spaces between the sleeves 104 and the adjacent portions of the exhaust tubes 52'. Valves 110 are inserted respectively into the air conduits 108 in order to adjust the quantity of air conducted to each perforated sleeve 104 and to control thereby any tendency to lateral variation in temperature of the transverse temperature gradient zone B.

In a similar manner, the air inlet or tempering conduits 84 of zone E (FIGURES 2 and 3) are omitted from zone E of FIGURES 6 and 7 and a heat exchanging tube 112 or 114, is placed about each of the exhaust tubes 52'. The outer tubular sleeves 114 are made relatively shorter than the central sleeves 112 in order to accommodate the nearer elbows 116 of the outermost exhaust tubes 52'.

The heat exchanging tubes or sleeves 112 and 114 likewise are supplied by means of a like number of regulated air inlet conduits 118 connected respectively thereto. Through the use of valves or dampers designated generally by the reference characters 120 in the air inlets 118 lateral or transverse temperature control within zone E is effected, as is also the case in zones B, C, and D.

The use of the heat exchanging tubes 104 in zone B permits greater control of the temperature rise imparted in this zone to the incoming glassware, inasmuch as zone B, as in other zones of the lehr, is heated primarily by convectional air currents which can be readily controlled and directed. Additionally, by increasing the flow of air through those air inlet conduits 110 coupled to the outermost sleeves 104 lateral heat losses can be compensated.

Similarly, a more rapid cooling of the glassware can be accomplished in zone E, when desirable, by the direct application of appropriately heated air thereto. Such rapid cooling usually is feasible because the glassware usually enters this zone at temperatures below 800° F. and therefore no longer can be permanently stressed. Lateral heat losses, of course, can be compensated in the same manner as described previously in connection with zone B of FIGURES 6 and 7 or of zones C and D (FIGURES 2 and 3).

As better shown in FIGURE 7 the exhaust tubes 52 are coupled at their outlet ends to the exhaust duct 88 and exhauster 74' as described previously with reference to FIGURES 1 to 5 of the drawings.

From the foregoing description of FIGURES 6 and 7 it will be readily apparent that the tempering air admitted directly to the exhaust conduits 52 of FIGURES 1 to 5 is omitted in the latter form of the invention. Therefore, in order to obviate any tendency to overheating of the exhaust tubes 52', the combustion chamber 122 or zone A of FIGURES 6 and 7 is provided with an air admission inlet 124 located opposite the burner 42'. The air inlet 124 desirably is provided with a suitable damper (not shown) or other means for controlling the quantity of air admitted therethrough. With the use of the air inlet 124, the temperature of the exhaust gases can be maintained readily at a point at or below the permissible maximum temperature, as dictated by the structural material of the exhaust tubes 52'. Moreover, the initial temperature head of the exhaust gases can be varied, as required by the differing type of glassware, without altering the total quantity of heat entering the exhaust tube 52'.

In other respects, the combustion chamber 122 is generally similar to the combustion chamber 16 of FIGURES 2 and 3, save that partition openings 126 of the partitions 128 are displaced forwardly so as to be juxtaposed to the air inlet 124. The entrance opening 50' of zone A is desirably closed, after the glassware is placed in the lehr, by means of a counter-weighted door 130.

Figure 8:
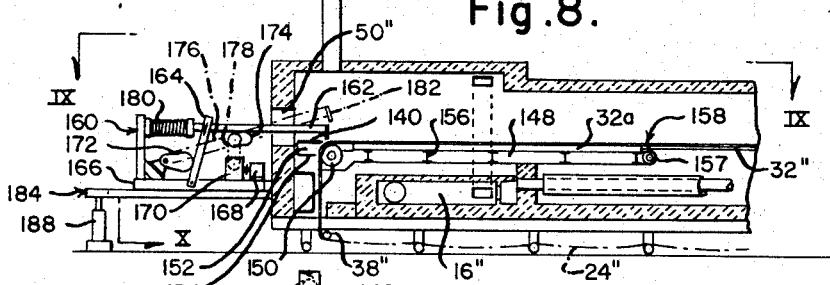
FIGURE 8 is a partial longitudinal and vertical section of still another form of annealing lehr arranged in accordance with the invention.
Figure 9:
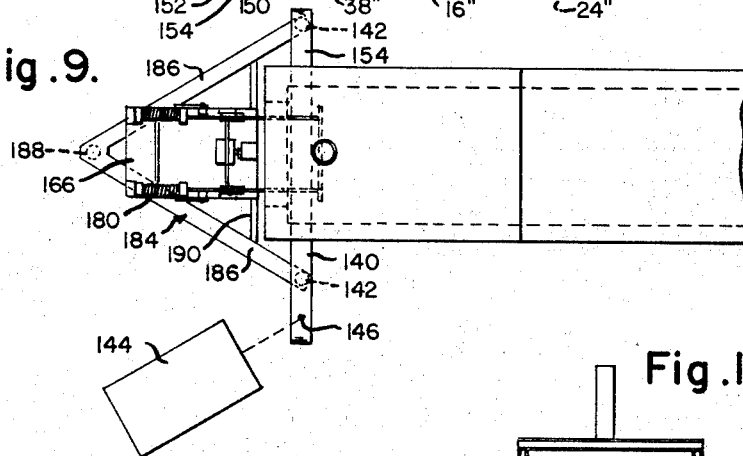
FIGURE 9 is a horizontally sectioned view of the annealing lehr portion of FIGURE 8 and taken along reference plane IX—IX thereof.
Figure 10:
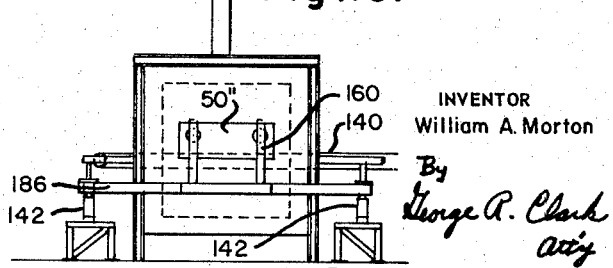
FIGURE 10 is an end elevational view of the lehr structure shown in FIGURE 9 and taken generally along reference plane X—X thereof.

Referring now to FIGURES 8 to 10 of the drawings, an exemplar loading conveyor arrangement, arranged for use with the aforementioned and similar lehr constructions, is illustrated therein. In the latter figures similar reference characters with double-primed accents denote similar components of the preceding figures. In this form of the invention, means are provided for maintaining the transverse or feed conveyor 140 always in a level position. However, the conveyor 140 is supported on a pair of lifting jacks 142 since the height of the feed conveyor 140 must be adjusted in order to accommodate thereon glassware of differing sizes. Inasmuch as the glassware is removed from the glassware machine denoted generally by reference character 144 by a transfer mechanism shown schematically at 146 which grasps the neck of the glassware or glass containers the distance of the neck from the bottom of the container therefore determines the elevation at which the feed conveyor 140 must be placed, in order for the transfer mechanism 146 to place the glassware thereon without dropping.

In the past, it has been the practice to use a much longer transverse conveyor in place of the conveyor 140 and then to raise and lower one end thereof, i.e., the end adjacent the transfer mechanism, in order to accommodate the differing sizes or heights of glassware being manufactured. The greater length of the conventional conveyor, of course, was dictated by that distance which would produce an attendant angle of inclination at the maximum and minimum heights of the transverse conveyor end, which would not induce toppling of the glassware on the transverse conveyor. However, the longer transverse conveyor forced a much greater separation between the lehr and the glassware machine 144 with the result that additional manufacturing time and greater temperature drops were encountered. Since glassware is virtually unannealable under a temperature of 800° F., it is important to transfer the glassware from the machine 144 to the lehr with as little delay as possible. Moreover, a reduction in time of transfer from the machine 144 to the lehr not only improves the annealing characteristics of the glassware, but also effects a saving of fuel consumed by the lehr, inasmuch as the glassware can be introduced therein at a higher temperature.

It has been found that by the use of the much shorter transverse conveyor 140 of the invention, that a saving of about 15 to 30 seconds results in the transfer of glassware from the machine 144 to the lehr conveyor. This saving in transfer time results in an increase of production between 1 and 2 percent from the combined glass manufacturing equipment. Further, the glassware now enters the lehr at a temperature of approximately 150° F. higher to improve fuel economy and annealing characteristics.

It is not practical, however, to raise and lower the entire lehr conveyor 24–32 (FIGURES 1 to 7, owing to the considerable length thereof and also owing to the fact that the heating patterns therein would be changed. Instead, it is contemplated by the invention that means be provided for raising and lowering only the front end portion of the conveyor 24, 32, which represents an area of the lehr in which the glassware is considerably above the annealing temperature range, and thus the temperature patterns are not critical.

In accordance with the invention one means for thus raising and lowering the front end portion of the lehr conveyor 24″–32″, comprises a pair of pivoted conveyor supporting arms 148 which are pivotally mounted on a pair of the juxtaposed uprights forming part of one of the lehr supporting frames 20″. On the forward end of the arms 148 a conveyor return roller 150 is rotatably mounted and extends therebetween. Each of the arms 148 is provided with a forwardly extending projection 152 which is suitably connected to the supporting bed 154 of the transverse conveyor 140. With this arrangement, the front end of the movable lehr conveyor portion, represented by the forward ends of the pivot arms 148 and the adjacent portion of the conveyor belts 24″, can be raised and lowered with the transverse conveyor 140, when the lift jacks 142 thereof are suitably manipulated. The length of the pivot arms 148 is such that at the maximum and minimum elevations of the transverse conveyor 140 and the forward ends of the pivot arms, the resultant angle of inclination will not induce toppling of the glassware placed thereon.

The arms 148 are maintained in the desired spaced positions by a number of transversely extending I-beams, angle irons, or the like 156. Mounted on the transverse supports 156 and extending along the length of the arms 148 is a section 32a of the aforementioned conveyor belt skid member 32″, which supports the conveyor belt 24″ in the region of the pivot arms 148. The rear end of the skid section 32a desirably is spaced slightly from the adjacent end of the belt supporting skid 32″, as denoted by reference character 158, to permit pivoting of the arms 148 and associated structure about their pivoted connection 157 to the lehr conveyor frame 32″.

The other front conveyor return roller 38″ can be normally mounted for rotation at a stationary location, and any additional slack or required added portion of conveyor belt 24″ resulting from lowering and raising respectively of the pivot arms 148 can be accommodated by the belt take-up unit 26, (FIGURES 3 and 7).

Also shown in FIGURES 8–10 of the drawings, is a novel arrangement for supporting a pusher mechanism 160 for use in transferring glassware from the transverse conveyor 140 to the lehr conveyor 24″, 32″ and particularly to the pivoted front end portion thereof. In this example, the pusher mechanism 160 exemplarily comprises a spring loaded push rord 162 and a pivoted operating arm 164 mounted upon a suitable frame 166. A drive motor 168 and gear box 170 also are mounted on the frame 166 and are arranged for rotating a pair of cam members 172 and 174 by means of chain drives 176 and 178. In this arrangement, the cam members 172, 174 are rotated counter-clockwise and are positioned for intermittent engagement with the pivoted operating arm 164 and with the lower surface of the push rod 162 respectively. By periodic engagement of the cam 172 with the operating arm 164 the push rod is recurrently inserted through the entrance slot 50′ of the lehr structure to push glassware from the transverse conveyor 140 onto the lehr conveyor pivoted portion 148–156. Further rotation of the cam 172 permits the tensioned spring 180 to withdraw the push rod 162 and at the same time the other cam engages the underside of the rod 162 to raise the push rod to the position denoted by dashed outline 182 so that on its return stroke, the push rod clears the tops of any glassware on the conveyor 140.

Inasmuch as the transverse conveyor 140 and the pivoted portion 148–156 of the lehr conveyor can be raised or lowered as described previously, it is desirable to provide convenient means for similarly raising and lowering the pusher mechanism 160. In accordance with the invention, this is accomplished by mounting the pusher mechanism supporting frame 166 on a boom structure denoted generally by the reference character 184, as best seen in FIGURE 9 of the drawings.

In a presently preferred form of the invention the boom structure 184 comprises a pair of angularly disposed beams 186 each secured at one end thereof to the transverse conveyor support 154, desirably adjacent the associated lifting jack 142, and secured together at their other ends. Such other ends desirably are supported by a third lifting jack 188. The pusher mechanism frame 166 then rests upon the beams 186 and upon a third or cross beam 190. With this arrangement, the pusher mechanism and transverse conveyor 140 are supported together upon a 3 point suspension comprising the lifting jacks 142 and 188. Thus, the pivoted lehr conveyor portion 148–156, the pusher mechanism 160, and the transverse loading conveyor 140 can all be raised and lowered simultaneously by suitable manipulation of the lifting jacks 142 and 188, thereby eliminating the need for tedious individual adjustment of the conveyors and pusher mechanism. It is contemplated by the invention that the lifting jacks 142 and 188 can be adjusted manually, or alternatively, suitable actuating mechanism can be provided therefor, such as a hydraulic cylinder and piston arrangement, which can be further arranged for simultaneous operation by a single operator.

From the foregoing, it will be apparent that novel and efficient modification of an annealing lehr have been disclosed herein. The descriptive and illustrative materials hereof have been employed for purposes of exemplifying the invention and not in limitation thereof. Therefore, numerous modifications of the invention will occur to those skilled in the art without departing from the spirit and scope of the invention. Moreover, it is to be understood that certain features of the invention can be employed to advantage without a corresponding use of other features thereof.

What I claim is:

1. In an annealing lehr the combination comprising a combustion chamber, an exhaust heating chamber, a plurality of exhaust tubes extending through said exhaust chamber and communicating with said combustion chamber, foraminous conveyor means supported for movement above said chambers and said exhaust tubes, an air inlet conduit system coupled to said exhaust tubes for introducing tempering air therein, heat exchanging means coupled to each of said exhaust tubes, and means for circulating air through said heat exchanging means and upwardly through said conveyor means.

2. In an annealing lehr the combination comprising a combustion chamber, an exhaust heating chamber, a plurality of exhaust tubes extending through said exhaust chamber and communicating with said combustion chamber, foraminous conveyor means supported for movement above said chambers and said exhaust tubes, an air inlet conduit system coupled to said exhaust tubes for introducing tempering air therein, heat exchanging means coupled to each of said exhaust tubes, and means for circulating air through said heat exchanging means and upwardly through said conveyor means, said heat exchanging means including a perforated tubular sleeve spacedly surrounding each of said exhaust tubes.

3. In an annealing lehr the combination comprising a combustion chamber, an exhaust heating chamber, a plurality of exhaust tubes extending through said exhaust chambers and communicating with said combustion chambers, foraminous conveyor means supported for movement above said chambers and said exhaust tubes, an air inlet conduit system coupled to said exhaust tubes for introducing tempering air therein, heat exchanging means coupled to each of said exhaust tubes, exhaust means for withdrawing exhaust gases from the outlet ends of said tubes, and means for circulating air and a portion of said exhaust gases through said heat exchanging means.

4. In an annealing lehr the combination comprising a combustion chamber, an elongated exhaust heating chamber tandemly adjoining said combustion chamber, a plurality of laterally spaced exhaust tubes extending longitudinally through said exhaust chamber and communicating with said combustion chamber, foraminous conveying means supported above said chambers and exhaust tubes, a first air inlet conduit system coupled to the inlet end portion of said exhaust tubes, a second air inlet conduit system coupled to the outlet end portions of at least the central exhaust tubes, means for circulating air through said first and second conduit systems for the introduction of tempering air into said exhaust tube end portions respectively, heat exchanging means coupled to each of said exhaust tubes at positions intermediate of said conduit systems, and means for circulating air through said heat exchanging means and upwardly through said conveyor means.

5. In an annealing lehr the combination comprising a combustion chamber, an elongated exhaust heating chamber tandemly adjoining said combustion chamber, a plurality of laterally spaced exhaust tubes extending longitudinally through said exhaust chamber and communicating with said combustion chamber, foraminous conveying means supported above said chambers and said exhaust tubes, a first air inlet conduit system coupled to the inlet end portion of said exhaust tubes, a second air inlet conduit system coupled to the outlet end portions of at least the central exhaust tubes, means for circulating air through said first and second conduit systems for the introduction of tempering air into said exhaust tube end portions respectively, heat exchanging means coupled to each of said exhaust tubes at positions intermediate of said conduit systems, and means for circulating air through said heat exchanging means and upwardly through said conveyor means, said heat exchanging means including a tubular sleeve spacedly surrounding each of said exhaust tubes with the top surfaces of said sleeve tubes being perforated along their length.

6. In an annealing lehr the combination comprising a combustion chamber, an elongated exhaust heating chamber tandemly adjoining said combusion chamber, a plurality of laterally spaced exhaust tubes extending longitudinally through said exhaust chamber and communicating with said combustion chamber, foraminous conveying means supported above said chambers and said exhaust tubes, a first inlet conduit system coupled to the inlet end portions of said exhaust tubes, a second air inlet conduit system coupled to the outlet portions of at least the central exhaust tubes, means for circulating air through said first and said second conduit systems for the introduction of tempering air into said exhaust tube end portions respectively, heat exchanging means coupled to each of said exhaust tubes at positions intermediate said conduit systems, and means for circulating air through said heat exchanging means and upwardly through said conveyor means, said heat exchanging means comprising a tubular sleeve spacedly surrounding each of said exhaust tubes with the top surfaces of said sleeve tubes being perforated along their length, said perforations being spaced and of such size that heated air issues therefrom at a constant temperature along the length of each sleeve tube, and valve means coupled in the air circulation means for each sleeve tube for the equalization of air temperatures issuing from each sleeve tube.

7. In an annealing lehr, the combination comprising a combustion chamber, an exhaust heating chamber, a plurality of exhaust tubes spacedly extending through said exhaust chamber, foraminous conveyor means supported above said chamber and said exhaust tubes, a plurality of valved air inlet conduits respectively coupled to said exhaust tubes adjacent the inlet ends thereof for the introduction of tempering air into said exhaust tubes, and a plurality of vertical guide paritions spacedly mounted adjacent the outlet end of said combustion chamber, the inlet ends of said exhaust tubes communicating respectively with the spaces between said guide partitions.

8. In an annealing lehr the combination comprising a combustion chamber, an elongated exhaust heating chamber tandemly adjoining said combustion chamber, a plurality of laterally spaced exhaust tubes extending longitudinally through said exhaust chamber and communicating with said combustion chamber, foraminous conveying means supported above said chamber and said exhaust tubes, a first air inlet conduit system coupled to the inlet end portion of said exhaust tubes, a second air inlet conduit system coupled to the outlet end portions of at least the central exhaust tubes, means for circulating air through said first and said second conduit systems for the introduction of tempering air into said exhaust tube end portions respectively, heat exchanging means coupled to each of said exhaust tubes at positions intermediate said conduit systems, means for circulating air through said heat exchanging means and upwardly through said conveyor means, said heat exchanging means including first and second sleeve tubes tandemly and spacedly surrounding each of said exhaust tubes, a first group of valved air circulating conduits coupled respectively to said first sleeve tubes, and a second group of valved air circulating conduits coupled respectively to said second sleeve tubes.

9. In an annealing lehr the combination comprising a combustion chamber, an exhaust heating chamber, a plurality of exhaust tubes extending through said exhaust chamber and communicating with said combustion chamber, foraminous conveyor means supported for movement above said chamber and said exhaust tubes, heat exchanging means coupled to each of said exhaust tubes, exhaust means for withdrawing exhaust gases from the outlet ends of said exhaust tubes, and means for circulating air and a portion of said exhaust gases through said heat exchanging means.

10. In an annealing lehr the combination comprising a combustion chamber, an exhaust heating chamber, a plurality of exhaust tubes extending through said exhaust chamber and communicating with said combustion chamber, foraminous conveyor means supported for movement above said chambers and said exhaust tubes, heat exchanging means coupled to each of said exhaust tubes, said heat exchanging means including a perforated tubular sleeve spacedly surrounding each of said exhaust tubes, and a valved conduit coupling each of said sleeves to a source of air for circulating controlled amounts of air through said sleeves respectively.

11. In an annealing lehr the combination comprising a combustion chamber, an exhaust heating chamber, a plurality of exhaust tubes extending through said exhaust chamber and communicating with said combustion chamber, foraminous conveyor means supported for movement above said chambers and said exhaust tubes, heat exchanging means coupled to each of said exhaust tubes in positions intermediate the ends thereof, means for circulating air through said heat exchanging means and upwardly through said conveyor means, said heat exchanging means including a plurality of sleeve tubes tandemly and spacedly surrounding each of said exhaust tubes and disposed so as to form an equivalent number of banks of such sleeve tubes extending tandemly along the length of said exhaust chamber, each of said banks extending transversely across the width of said lehr, and a plurality of groups of valved air circulating conduits coupled respectively to said sleeve tube banks, the conduits of each of said groups being coupled respectively to the sleeve tubes of the associated sleeve tube bank.

12. In an annealing lehr the combination comprising a combustion chamber, an exhaust heating chamber, a plurality of exhaust tubes extending through said exhaust chamber and communicating with said combustion chamber, foraminous conveyor means supported for movement above said chambers and said exhaust tubes, heat exchanging means coupled to each of said exhaust tubes in positions intermediate the ends thereof, means for circulating air through said heat exchanging means and upwardly through said conveyor means, said heat exchanging means including a plurality of sleeve tubes tandemly and spacedly surrounding each of said exhaust tubes and disposed so as to form an equivalent number of banks of such sleeve tubes extending tandemly along the length of said exhaust chamber, each of said banks extending transversely across the width of said lehr, and a plurality of groups of valved air circulating conduits coupled respectively to said sleeve tube banks, the conduits of each of said groups being coupled respectively to the sleeve tubes of the associated sleeve tube bank, the top surface of said sleeve tubes being perforated along their lengths and the sleeve tubes of each said exhaust tubes being closely spaced and extending substantially along the entire length of said exhaust chamber so that the longitudinal and transverse temperature gradient of said exhaust tubes can be controlled throughout said exhaust chamber.

13. In an annealing lehr the combination comprising a combustion chamber, an exhaust heating chamber, a plurality of exhaust tubes extending through said exhaust chamber and communicating with said combustion chamber, foraminous conveyor means supported for movement above said chambers and said exhaust tubes, heat exchanging means coupled to each of said exhaust tubes in positions intermediate the ends thereof, means for circulating air through said heat exchanging means and upwardly through said conveyor means, said heat exchanging means including a plurality of sleeve tubes tandemly and spacedly surrounding each of said exhaust tubes and disposed so as to form an equivalent number of banks of such sleeve tubes tandemly along the length of said exhaust chamber, each of said banks extending transversely across the width of said lehr, and a plurality of groups of valved air circulating conduits coupled respectively to said sleeve tube banks, the conduits of each of said groups being coupled respectively to the sleeve tubes of the associated sleeve tube bank, the outlet ends of said exhaust tubes being coupled to exhaust duct work and exhaust means therefor, and a valved conduit system coupling said exhaust means to at least one group of said valved air inlet conduits.

14. In an annealing mechanism the combination comprising a combustion chamber, an exhaust heating chamber, a plurality of exhaust tubes extending through said exhaust chamber and communicating with said combustion chamber, foraminous conveyor means supported for movement above said chambers and said exhaust tubes, heat exchanging means coupled to each of said exhaust tubes, exhaust means for withdrawing exhaust gases from the outlet ends of said exhaust tubes, the front end portion of said conveyor means support including a pair of pivotally mounted arms extending generally longitudinally of said conveyor means, means for pivotally mounting the rear ends of said arms, transverse conveyor means extending through the front end portion of said lehr and adjacent a front end opening thereof, the front ends of said pivoted arms being secured to said transverse conveyor means so that the front ends of said pivoted arms and the front portion of said lehr conveyor means can be raised and lowered with said transverse conveyor means, and means for raising and lowering said transverse conveyor means.

References Cited
UNITED STATES PATENTS

| | | | |
|---|---|---|---|
| 1,584,241 | 5/1926 | Mulholland | 263—8 |
| 1,674,794 | 6/1928 | Peiler | 626—8 |
| 1,778,763 | 10/1930 | La France | 263—8 |
| 1,947,408 | 2/1934 | Eastman | 263—8 X |
| 2,758,822 | 8/1956 | Sauter | 165—120 |

FREDERICK L. MATTESON, Jr., *Primary Examiner.*

JOHN J. CAMBY, *Assistant Examiner.*

UNITED STATES PATENT OFFICE
CERTIFICATE OF CORRECTION

Patent No. 3,378,243　　　　　　　　　　April 16, 1968

William A. Morton

It is certified that error appears in the above identified patent and that said Letters Patent are hereby corrected as shown below:

Column 2, line 57, "rack" should read -- rock --; line 61, "of", second occurrence, should read -- or --.
Column 3, line 72, "conrol" should read -- control --.
Column 7, line 35, "7" should read -- 7) --. Column 8, line 15, "rord" should read -- rod --. Column 9, line 37, after "said" insert -- exhaust --.

Signed and sealed this 7th day of October 1969.

(SEAL)
Attest:

Edward M. Fletcher, Jr.　　　　　　　WILLIAM E. SCHUYLER, JR.
Attesting Officer　　　　　　　　　　　Commissioner of Patents